(12) United States Patent
Olier

(10) Patent No.: US 11,310,076 B2
(45) Date of Patent: Apr. 19, 2022

(54) HIGH-AVAILABILITY SECURE COMMUNICATION SYSTEM

(71) Applicant: Atos Integration, Bezons (FR)

(72) Inventor: Denis Olier, Achères (FR)

(73) Assignee: BULL SAS, Les Clayes sous-Bois (FR)

( * ) Notice: Subject to any disclaimer, the term of this patent is extended or adjusted under 35 U.S.C. 154(b) by 3 days.

(21) Appl. No.: 16/958,215

(22) PCT Filed: Dec. 21, 2018

(86) PCT No.: PCT/EP2018/086826
§ 371 (c)(1),
(2) Date: Jun. 26, 2020

(87) PCT Pub. No.: WO2019/129756
PCT Pub. Date: Jul. 4, 2019

(65) Prior Publication Data
US 2021/0075642 A1 Mar. 11, 2021

(30) Foreign Application Priority Data
Dec. 27, 2017 (FR) ...................................... 1701384

(51) Int. Cl.
*H04L 12/46* (2006.01)
*H04W 12/06* (2021.01)
(Continued)

(52) U.S. Cl.
CPC ...... *H04L 12/4633* (2013.01); *H04L 63/0272* (2013.01); *H04W 12/06* (2013.01);
(Continued)

(58) Field of Classification Search
CPC . H04L 12/4633; H04L 63/0272; H04L 43/50; H04L 41/0654; H04W 12/06;
(Continued)

(56) References Cited

U.S. PATENT DOCUMENTS

| 8,909,766 B1 | 12/2014 | Hegg et al. |
| 8,988,249 B2 * | 3/2015 | Chevrette ................ G01D 4/02 340/870.02 |

(Continued)

FOREIGN PATENT DOCUMENTS

| EP | 2 887 571 A1 | 6/2015 |
| EP | 2 947 615 A1 | 11/2015 |

(Continued)

OTHER PUBLICATIONS

International Search Report of the International Searching Authority for PCT/EP2018/086826 dated Apr. 5, 2019.
(Continued)

*Primary Examiner* — Brandon J Miller
(74) *Attorney, Agent, or Firm* — Arc IP Law, PC; Joseph J. Mayo

(57) ABSTRACT

A system for high-availability secure communication between a mobile terminal and an application server. The terminal is connected to a communication box having at least three physical communication interfaces, a first interface used for communicating with the terminal. The communication box connected to an access server by first and second links through corresponding first and second physical remote communication interfaces. The application server connected to the access server. The terminal and the application server communicating through the communication box and the access server using one of two previously established links. The communication box is the network gateway of the terminal. The communication box: maintains a local routing table based on the routing performance of at least one physical remote communication interface; maintains a remote routing table on the access server so that the communication box and the access server use the same link at the same time.

14 Claims, 2 Drawing Sheets

(51) Int. Cl.
  *H04W 40/24* (2009.01)
  *H04W 48/18* (2009.01)
  *H04W 88/06* (2009.01)
  *H04W 88/16* (2009.01)
  *H04L 29/06* (2006.01)

(52) U.S. Cl.
  CPC ......... *H04W 40/248* (2013.01); *H04W 48/18* (2013.01); *H04W 88/06* (2013.01); *H04W 88/16* (2013.01)

(58) Field of Classification Search
  CPC ... H04W 40/248; H04W 48/18; H04W 88/06; H04W 88/16; H04W 12/45; H04W 12/00; H04W 4/90
  See application file for complete search history.

(56) References Cited

U.S. PATENT DOCUMENTS

2011/0193718 A1   8/2011   Chevrette et al.
2014/0247711 A1*  9/2014   Gantman .............. H04W 48/20
                                                      370/221

FOREIGN PATENT DOCUMENTS

FR      3 019 435 A1    10/2015
WO    2011/041913 A1     4/2011

OTHER PUBLICATIONS

English translation of International Search Report of the International Searching Authority for PCT/EP2018/086826 dated Apr. 5, 2019.

* cited by examiner

HIGH-AVAILABILITY SECURE COMMUNICATION SYSTEM

TECHNICAL FIELD OF THE INVENTION

The object of the present invention is a high-availability secure communication system.
The field of the invention is that of secure communications. "Secure" means toughened security for use by, or for, state services. It is therefore necessary that these communications cannot be prevented or intercepted.

In this context, high availability is a resistance to interference and to breakdown, whether this breakdown is due to the physical failure of an item of equipment or to a logic failure. These breakdowns are accidental, circumstantial or intentional breakdowns.

A circumstantial breakdown is for example due to an exceptional situation for which an item of equipment was not designed. Such breakdowns have occurred, for example, at the start of text messaging on the occasion of New Year's celebrations.

An intentional breakdown is an intentional attempt to cause a system to fail, for example with a denial-of-service attack.

The field of the invention also is that of communications in times of crisis, that is communications to be established in a context that is out of the ordinary. An extraordinary context is for example a natural disaster, a situation in which people's physical safety is threatened, a large-scale disaster or a military operation. An extraordinary context is also any situation that leads to civilians, as opposed to public order professionals, increasing their consumption of communication resources.

PRIOR ART

It is known from the prior art that exceptional events can take place. These situations generally cause panic which, from the perspective of conventional communications systems, is an attack liable to adversely affect their operation. Such situations often involve communications carrying, and comprising, sensitive data. It is therefore important for this data to be correctly conveyed without being intercepted.

Devices allowing to establish secure communications are known from the prior art. However, these existing devices require the apparatuses participating in establishing the communication to be compatible. In concrete terms, this means that the apparatuses have to be the same. However, these highly specialized apparatuses offer greatly reduced services. Most often, only voice communications are possible.

Another problem with the existing devices is their sensitivity to the reliability of the network to which they are connected. This network is singular. In these conditions, failure of this network is catastrophic and leaves the user without simple seamless operation. In particular, if the user was in the process of holding a conversation, said conversation is terminated as a result.

Thus, document WO2011/041913 proposes a secure communication system for a mobile terminal for establishing local and remote communications. This system enables a large number of communications between data-producing terminals, and a communication box allowing to remotely communicate this data. However, this system may be unreliable if the box is defective.

Document FR3019435 proposes a process for routing data by an Internet access box. The communication system comprises a communication box which can communicate wirelessly with a second, different box, in order to propose an alternative network, each box allowing communication over a single remote network.

DISCLOSURE OF THE INVENTION

The invention makes it possible to solve these problems by implementing a network redundancy. More specifically, the invention implements a communication link redundancy. In the invention, this redundancy is based on a physical redundancy.

Thus, in the invention, a terminal, optionally a market-standard terminal, is connected to a communication box which comprises two modems, each allowing it to establish a secure link to an access server. The communication box chooses the link to be used based on predefined, configurable criteria. If one of the links becomes defective, all communications are carried out using the other link.

With this in mind, the object of the invention is a very high-availability secure communication system for a mobile terminal for establishing local and remote communications, characterized in that:
the terminal is connected to a communication box, said communication box having at least 4 physical communication interfaces:
one of these physical interfaces serving to establish communications (NATM) with the mobile terminal,
two of these physical interfaces serving to establish remote communications via mobile networks,
the fourth (270) of these physical interfaces serving to establish local communications with another box (700) by direct communication and according to an IP protocol according to a predetermined addressing plan.

In addition to the main features which have just been mentioned in the previous paragraph, the process according to the invention may have one or more of the following additional features, considered individually or in technically possible combinations:
the fourth interface operates in a frequency band centered on 900 MHz
the communication box uses the fourth interface when the first remote interface and the second remote interface are defective the mobile terminal communicates with an application server as follows:
the communication box is connected to an access server (500) by a first link (VPN0) established through the first physical remote communication interface and by a second link (VPN1) established through the second physical remote communication interface;
the application server (600) is connected (NATA) to the access server, the terminal and the application server communicating through the communication box and the access server using one of the two previously established links;
the communication box is the network gateway of the terminal;
the communication box:
maintains (2020-2050) a local routing table based on the routing performance of at least one physical remote communication interface;
maintains (2050) a remote routing table on the access server so that the communication box and the access server are using the same link at the same time
the local interface of the communication box is a wired serial interface;
the local interface of the communication box is a wireless communication interface;

the routing performance of a physical communication interface is a measure of the power of a signal received on the physical remote communication interface, the routing performance of which is to be evaluated;

the routing performance of a physical communication interface is measured by a response time to a predetermined message transmitted via the remote communication interface, the routing performance of which is to be evaluated;

the predetermined message is transmitted at a period within the range of 2 seconds-5 seconds;

the routing performance of a physical interface is considered to be defective if the response time to the predetermined message is greater than 1 second;

the first link and the second link are virtual private tunnels;

the box comprises a provisional memory in which an identifier of a terminal is stored, only the terminal that has this identifier being authorized to communicate with the box by a wireless local communication interface, the box filtering communications made by the wireless local communication interface, the identifier being a MAC address of the wireless physical communication interface of the terminal;

the provisional memory is written at the moment a connection is detected on a wired physical communication interface between the mobile terminal and the communication box, the terminal serving as a peripheral device for the box.

BRIEF DESCRIPTION OF THE FIGURES

Other features and advantages of the invention will emerge from reading the following description, with reference to the attached figures, which show.

For greater clarity, identical or similar elements are identified by identical reference symbols in all the figures.

The invention will be better understood by reading the following description and examining the accompanying figures. These are presented for information purposes only and in no way limit the invention.

DETAILED DESCRIPTION OF AN EMBODIMENT

Figure 1:
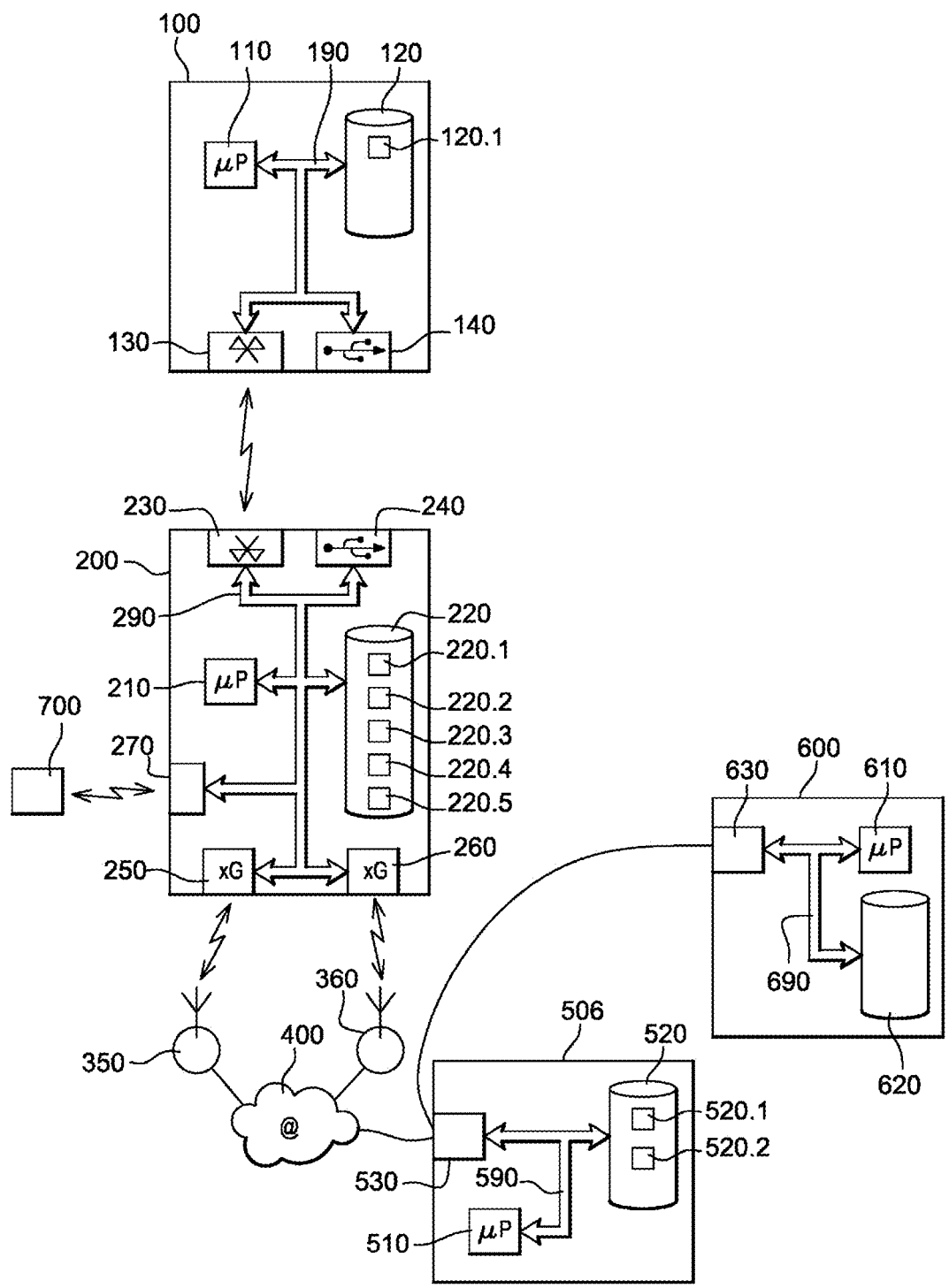
FIG. 1: an illustration of an architecture enabling the implementation of the communication system according to the invention.

FIG. 1 shows a mobile terminal 100. The mobile terminal 100 is for example a smartphone. The mobile terminal 100 may also be a tablet. More generally, any portable device for processing data which comprises at least the features described for the mobile terminal 100 can be considered to be a mobile terminal for the purposes of the invention.

FIG. 1 shows the features that a mobile terminal must have in order to implement the invention.

FIG. 1 shows that the mobile terminal 100 comprises:
a microprocessor 110;
a memory 120. In this description, the memory is depicted in a unified manner. In practice, a mobile device comprises at least one working memory and a mass storage memory. These memories of RAM memory type and of flash memory type;

A wired physical local communication interface 140. Such an interface is for example a serial interface according, for example, to one of the USB standards or the IEEE 1394 standard;

A wireless physical local communication interface 130. Wireless communication is also referred to as "Over-The-Air" communication, abbreviated to OTA. Such an interface is for example an interface according to one of the Bluetooth, Wi-Fi, Zigbee, BTLE (Bluetooth Low Energy) standards.

FIG. 1 shows that the microprocessor 110 of the mobile terminal, the memory 120 of the mobile terminal, the wired physical local communication interface 140 of the mobile terminal and the OTA physical local communication interface 130 are interconnected by a bus 190 of the mobile terminal.

FIG. 1 also shows a communication box (200). FIG. 1 shows that the communication box comprises:
A microprocessor 210;
A memory 220;
Physical local communication interfaces:
A wired physical local communication interface 240;
A wireless physical local communication interface 230;
A first physical remote communication interface 250;
A second physical remote communication interface 260;
A fourth direct physical communication interface 270.

A remote communication interface is for example a communication interface according to a mobile telephony standard. These standards are known as:
The first generation, or 1G, standard;
The second generation, or 2G, standard;
The third generation, or 3G, standard;
The fourth generation, or 4G, standard;
The B40 standard;
. . . .

The above list is not exhaustive. It is also possible to use a Wi-Fi or WiMAX standard to establish a remote communication.

Independently of mechanical considerations, the communication box 200 comprises a mobile telephone motherboard connected to an OTA communication modem expansion board. This therefore gives, in a simplified manner, processing means connected to two modems.

In practice, each physical remote communication interface is associated with a SIM card or equivalent in terms of means for managing access rights to a network. These SIM cards are not depicted. A physical remote communication interface is therefore at least one modem compatible with a mobile telephony standard.

A direct communication interface is a radio communication interface which enables two devices in radio range of each other to communicate. In a variant of the invention, the fourth direct communication interface operates in the "900 MHz" frequency band.

In this document, a distinction is made between a local communication, a remote communication and a direct communication. Nonetheless, some OTA standards can be employed for the three types of communication. This is the case for example for Wi-Fi standards.

In the invention, a local communication is considered to be a communication between a terminal and a peripheral device of this terminal.

Hereinafter, one of the physical local communication interfaces of the box will be designated the local communication interface of the box, it being understood that it communicates with a compatible local communication interface of the mobile terminal.

FIG. 1 shows that the microprocessor 210 of the box, the memory 220 of the box, the wireless physical local communication interface 230 of the box, the wired physical local communication interface 240 of the box, the first physical remote communication interface 250 of the box, the second physical remote communication interface 260 of the box and the fourth direct communication interface of the box are interconnected by a bus 290 of the box.

FIG. 1 shows that the first physical remote communication interface 250 of the box allows to establish an OTA communication with a first base station 350 of a first mobile communication network.

FIG. 1 shows that the second physical remote communication interface 260 of the box allows to establish an OTA communication with a second base station 360 of a second mobile communication network.

The communication box therefore allows to establish two physical links, in the sense of a physical layer from the ISO model.

Each of the communication networks is connected, in whole or in part, to the Internet 400.

FIG. 1 also shows that the fourth direct physical communication interface of the box allows to establish an OTA communication with another box 700 that is directly visible by radio from the first box.

FIG. 1 shows an access server 500. FIG. 1 shows that the server 500 comprises:
A microprocessor 510;
A memory 520;
A communications interface 530 enabling:
Connection thereof to the Internet network 400;
Connection thereof to an application server 600.

FIG. 1 shows that the microprocessor 510 of the access server, the memory 520 of the access server and the communication interface 530 of the access server are interconnected by a bus 590 of the access server.

FIG. 1 shows that the application server 600 comprises:
A microprocessor 610;
A memory 620;
A communications interface 630 enabling:
Connection thereof to the access server 500.

FIG. 1 shows that the microprocessor 610 of the application server, the memory 620 of the application server and the communication interface 630 of the application server are interconnected by a bus 690 of the application server.

When an action is attributed to a device, it is actually performed by a microprocessor of the device controlled by instruction codes stored in a memory of the device. If an action is attributed to an application, it is actually performed by a microprocessor of the device in a memory in which the instruction codes corresponding to the application are stored. When a device or an application transmits a message, this message is transmitted via a communication interface of said device or of said application. A message comprises at least one destination address field, an issuer address field and a payload. These principles are applicable whether the device is real or virtual.

The notion of memory is also generalized, it being understood that, unless specifically indicated to the contrary, for a device this notion covers all the memories which it can access. This includes in particular its:
Working memories, generally of RAM type;
Storage memories:
Local or remote;
Fixed or removable;
Mechanical (hard drive, abbreviated to HD) or electronic (SD card or SSD drive).

FIG. 1 shows that the memory 120 of the mobile terminal comprises:
A zone 120.1 comprising application instruction codes needing to establish a connection with an application server located on an application network. Said application server is described below with FIG. 3.

FIG. 1 shows that the memory 220 of the box comprises:
A zone 220.1 comprising instruction codes for implementing the invention;
A zone 220.2 comprising instruction codes for establishing virtual private networks, also referred to as VPN;
A VPN configuration zone 220.3 comprising configuration data for two virtual private networks;
A routing table zone 220.4;

FIG. 1 shows that the memory 520 of the access server comprises:
A zone 520.1 comprising instruction codes for implementing the invention;
A zone 520.2 comprising instruction codes for establishing VPNs;
A routing table zone 520.3.

Instruction codes for establishing VPNs are for example the OpenVPN (registered trademark) application. More generally, any tunnel building technology compatible with the network routing may be used.

Figure 2:
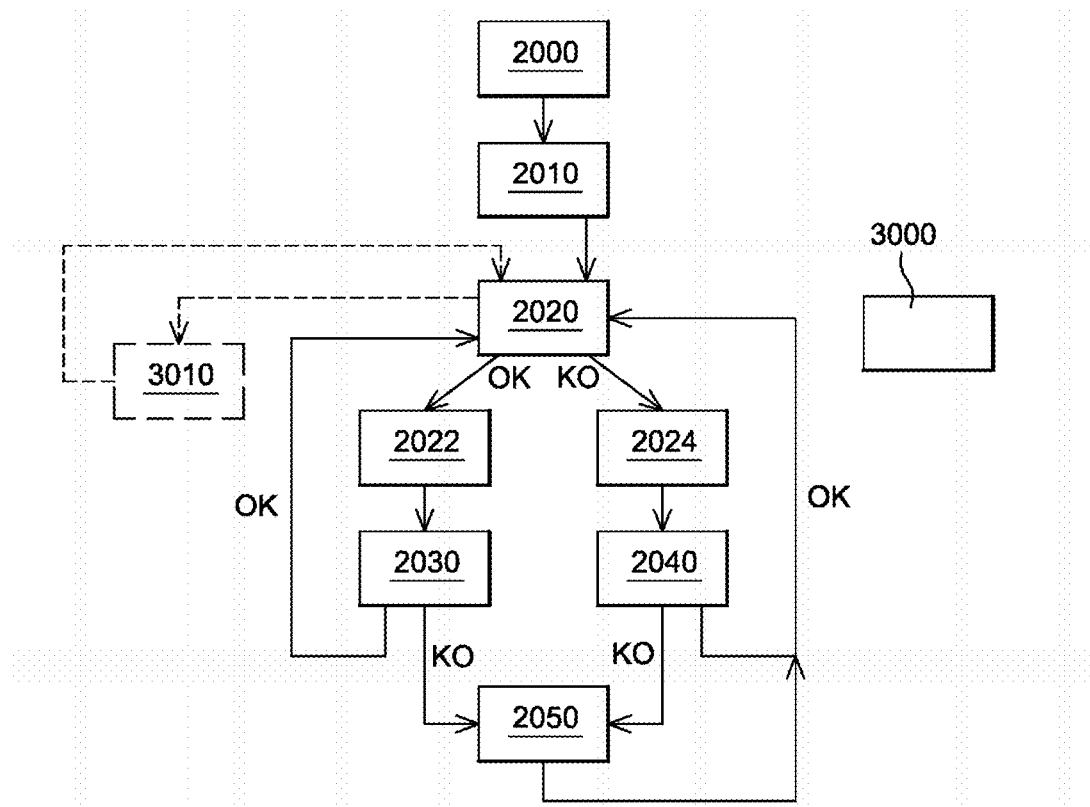
FIG. 2: an illustration of steps of the communication process implemented by the communication system according to the invention.

FIG. 2 shows a step 2000 for initializing the communication box 200. In this step, the box is provided with two SIM cards, one for each physical remote communication interface, which allows for each physical remote communication interface to connect to a mobile communication infrastructure and, via this connection, to obtain a communication context allowing to use the physical remote communication interface to access the Internet 400.

A conventional use of the invention is to use a "private" SIM card and a "public" SIM card. For this paragraph, the distinction between public and private is made in terms of the accessibility to the general public as opposed to accessibility to a state-type administrative body. A "private" SIM card allows to connect to a private mobile telecommunications network.

These initialization steps are conventional and carried out by any device fitted with a SIM card. This corresponds to starting up the communication box 200.

The communication box then moves to a step 2010 of building VPN tunnels. This building is carried out according to the configurations pre-stored in the zone 220.3 for configuration of the communication box 200.

In practice, the instructions for configuring VPN tunnels comprise at least one destination address for the tunnels. In the invention, this destination address is an Internet address of the access server 500.

Figure 3:
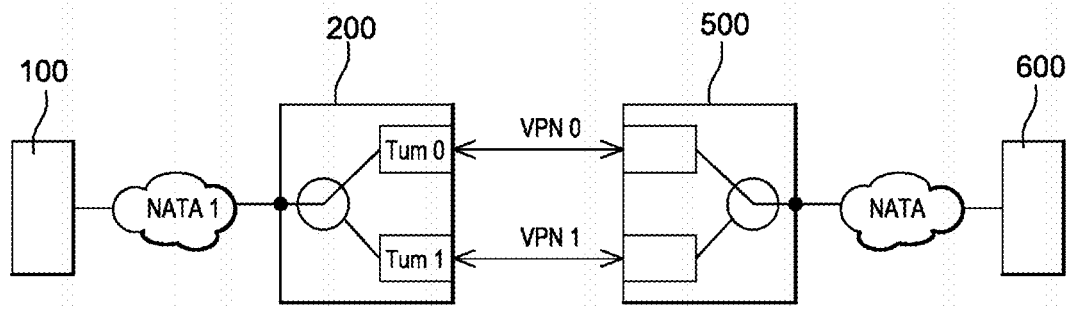
FIG. 3: a logic diagram of the communications implemented by the invention.

FIG. 3 shows that, once the VPN tunnels have been built, this gives a situation in which the communication box 200 comprises two virtual network interfaces, each associated with an IP address:
First physical remote communication interface:
First virtual network interface "tun0" associated with an address IP_VPN_PRIV, corresponding to a first virtual private network VPN0. This constitutes a first link which can be used by the box to communicate with the access server.
Second physical remote communication interface:
Second virtual network interface "tun1" associated with an address IP_VPN_PUB, corresponding to a second virtual private network VPN1. This constitutes a second link which can be used by the box to communicate with the access server.

The virtual network interfaces of the communication box have their mirror interfaces on the access server 500 side.

The invention is provided to be used in a context such that at least one application server belongs to a NATA application network known in advance. The NATA application network is located "behind" the access server. In other words, the application network is reached through the access server.

Also for the use of the invention, when the mobile terminal is connected to the communication box, it is allocated an IP address provided in advance, for example an address dependent on a unique identifier of the communication box. The mobile terminal and the communication box therefore belong to the same NATM network. In this NATM network, the mobile terminal is configured to use the communication box as a gateway.

At this stage of building virtual private networks:
The communication box comprises, in its routing table, a default route for reaching the NATA network;
The access server comprises, in its routing table, a default route for reaching the NATM network.

Thus, a network message transmitted by the mobile terminal and bound for the application server is routed in a virtual private network according to the routing table of the communication box.

Thus, a network message transmitted by the application server and bound for the mobile terminal is routed in a virtual private network according to the routing table of the access server.

Upon initialization of the box, the routing is configured to use a predetermined physical remote communication interface. This is configuration of the box.

The box then moves to a step 2020 of monitoring of the quality of the links established by at least one physical remote communication interface.

Step 2020 is carried out at a predetermined period. Such a period is within the range from 2 to 5 seconds. In step 2020, the communication box produces a piece of data, for example a message, associating a physical remote communication interface identifier with a quality indicator. Such an indicator may be binary: good or bad. In practice, a single interface may be tested, for example the interface corresponding to the private mobile communication network.

If the test finds that the performance of the tested interface is good, then the process moves to a step 2022 for selecting the tested interface.

If the test finds that the performance of the tested interface is bad, then the process moves to a step 2024 for selecting the non-tested interface.

In step 2022 for selecting the interface, the box executes a step 2030 for testing the active interface for routing. This test is carried out, for example, by consulting the routing table of the box in order to read off the active route for reaching the NATA application network. If this route corresponds to the tested interface then the box returns to step 2020 for testing performance. If this route does not correspond to the tested interface then the box moves to a step 2050 for changing the interface, giving as parameter an identifier of the interface that has just been tested.

In step 2024 for changing the interface, the box executes a step 2040 of testing the active interface for routing. This test is carried out, for example, by consulting the routing table of the box in order to read off the active route for reaching the NATA application network. If this route corresponds to the non-tested interface then the box returns to step 2020 for testing performance. If this route does not correspond to the non-tested interface then the box moves to a step 2050 for changing the interface, giving as parameter an identifier of the non-tested interface.

In step 2050, the box carries out the following actions:
It modifies its routing table based on the parameter received. In practice, this amounts to changing the route for reaching the NATA application network.
Transmits a message bound for the access server, in order for same to change its route for reaching the NATM mobile network. Such a message can contain an identifier of the interface to be used for the new route, or be a simple change message as long as there are only two possible routes.

At the end of step 2050 the box returns to step 2020 for testing the performance of the interface.

This change of route is entirely transparent for the application layers of the mobile terminal, including for voice communications. Shifting from one route to the other happens without any perceivable disruption for the user.

It should be noted that the variant described is a variant with preference for a physical remote communication interface corresponding to a private mobile communication network. If this network is available, then it should be used.

The invention remains valid if it is decided to remain on the current route as long as the performance of the underlying physical network is satisfactory.

There are several ways to evaluate performance. A first way is using a test message. Such a message is for example a "ping" message. The box transmits a "ping" message bound for the access server. The access server responds to this message, which enables the box to measure the time taken for the message to make a round trip. Depending on this time, the box allocates a measure of performance to the physical interface. For example, if the round trip time is greater than 1 second, the performance is bad. Otherwise, it is good.

Another way of measuring performance is a measurement of network jitter. Use is then made of a maximum jitter value as a threshold for going from good to bad performance.

Yet another way of measuring performance is a measurement of the power received at an antenna of the interface tested. If this power is greater than a predetermined threshold, the performance is considered to be good. Otherwise, it is bad.

The invention enables the mobile terminal to communicate with the application server transparently and securely. The communications between the mobile terminal and the communication box are carried out through a local communication interface, whether it is wired or wireless. FIG. 1 illustrates that two interfaces are possible. On this physical local communication interface, the communications are made using the IP protocol. Use is then made of "IP over USB" or "IP over Bluetooth", as appropriate. From then on, there is a local network (NATM) to which at least the terminal and the box are connected. In this configuration, the box is the gateway of the terminal, that is to say that the box manages all the IP traffic leaving the mobile terminal. This includes in particular the traffic bound for the application network.

The communication system thus obtained is high-availability since, in the event of failure of a physical link, the box can continue to communicate on the other link. Moreover, moving from one link to the other occurs without disruption for the user of the terminal.

In a variant of the invention, in monitoring step 2020, the box detects that both the physical remote communication interfaces are unusable. Such a situation arises, for example, if the box is underground or if a user of the box deactivates remote communications.

In this case, the box moves to a step 3010 for managing the communications, using the fourth direct communication interface. In order to communicate over this fourth direct communication interface, the communication box uses IP-compatible protocols. For this purpose, each box is configured to use a static IP address specific to that box. Thus, all the existing boxes belong to the same local network and can communicate with one another. The messages transmitted via the fourth direct communication interface are thus received by all boxes within radio range of one another.

The IP address used by the fourth direct communication interface is either entirely allocated at the activation of the box, or calculated from characteristics of the box. In this case, the calculation guarantees a unique IP address per box.

In a variant of the invention, the box only agrees to communicate with a wireless local communication interface if the terminal is identified. This identification is carried out, for example, by providing the MAC address of the mobile terminal at the communication box. In other words, the communication box comprises a configuration memory in which MAC addresses of devices authorized to use the wireless physical local communication interface are stored.

In this variant, the communication box comprises a memory 220.5 in which a MAC address is stored. This MAC address serves to filter the messages received via the wireless physical communication interface. All messages received by this interface with a transmitter field value that does not correspond to this MAC address are ignored.

The memory 220.5 may be written in the factory when the box is manufactured.

The memory 220.5 may be updated during a step 3000 following the detection by the box of a physical connection to its physical local communication interface, i.e., in one example, to its USB interface. In this case, the terminal is provided with a USB driver specific to the invention. During the USB negotiation, this driver specific to the invention transmits a message comprising the MAC address of its wireless physical communication interface.

Upon receipt of this message, the box updates the contents of the provisional memory.

In this variant of the invention, a terminal can only communicate wirelessly with a box if it has been connected thereto at least once in a wired manner.

Step 3000 of provisioning occurs each time the box is connected to a peripheral device in a wired manner. It is thus possible to pair a box with any terminal comprising a compatible driver.

What is claimed is:

1. A very high-availability secure communication system for a mobile terminal for establishing local and remote communications, comprising:
a mobile terminal connected to a communication box, said communication box comprising at least four physical communication interfaces comprising a first physical communication interface, a second physical communication interface, a third physical communication interface, a fourth physical communication interface, wherein
the first physical communication interface serves to establish communications via Narrowband Asynchronous Transfer Mode (NATM) with the mobile terminal,
the second physical communication interface is a first physical remote communication interface and the third physical communication interface is a second physical remote communication interface, wherein the first physical remote communication interface and the second physical remote communication interface serve to establish remote communications via mobile networks,
the fourth physical communication interface serves to establish local communications with another box by direct communication and according to an IP protocol according to a predetermined addressing plan;
wherein the communication box uses the fourth physical communication interface when the first physical remote communication interface and the second physical remote communication interface are defective;
wherein the mobile terminal communicates with an application server as follows:
the communication box is connected to an access server by a first link of a Virtual Private Network (VPN0) established through the first physical remote communication interface and by a second link of a Virtual Private Network (VPN1) established through the second physical remote communication interface;
the application server is connected to the access server, the mobile terminal and the application server communicate through the communication box and the access server using one of the first link (VPN0) and the second link (VPN1);
the communication box is a network gateway of the mobile terminal;
the communication box:
maintains a local routing table based on a routing performance of at least one physical remote communication interface;
maintains a remote routing table on the access server so that the communication box and the access server are using a same link at a same time.

2. The very high-availability secure communication system according to claim 1, wherein the fourth physical communication interface operates in a frequency band centered on 900 MHz.

3. The very high-availability secure communication system according to claim 1, wherein one or more of the at least four physical communication interfaces of the communication box is a wired serial interface.

4. The very high-availability secure communication system according to claim 3, wherein one or more of the at least four physical communication interfaces of the communication box is a wireless communication interface.

5. The very high-availability secure communication system according to claim 1, wherein the routing performance of the at least one physical remote communication interface is a measure of a power of a signal received on the at least one physical remote communication interface, the routing performance of which is to be evaluated.

6. The very high-availability secure communication system according to claim 1, wherein the routing performance of the at least one physical remote communication interface is measured by a response time to a predetermined message transmitted via the at least one physical remote communication interface, the routing performance of which is to be evaluated.

7. The very high-availability secure communication system according to claim 6, wherein the predetermined message is transmitted at a period within a range of 2 seconds to 5 seconds.

8. The very high-availability secure communication system according to claim 6, wherein the routing performance of the at least one physical remote communication interface is considered to be defective if the response time to the predetermined message is greater than 1 second.

9. The very high-availability secure communication system according to claim 1, wherein the first link and the second link are virtual private tunnels.

10. The very high-availability secure communication system according to claim 1, wherein the communication box further comprises a provisional memory in which a unique identifier of a terminal is stored, wherein only the terminal comprising the unique identifier is authorized to communicate with the communication box by a wireless local communication interface, wherein the communication box filters communications made by the wireless local communication interface, and wherein the unique identifier is a MAC address of the wireless local communication interface of the terminal.

11. The very high-availability secure communication system according to claim 10, wherein the provisional memory is written at a moment when a connection is detected on a wired physical communication interface between the mobile terminal and the communication box, the terminal serving as a peripheral device for the communication box.

12. A very high-availability secure communication system for a mobile terminal for establishing local and remote communications, comprising:
a mobile terminal connected to a communication box, said communication box comprising at least four physical communication interfaces comprising a first physical communication interface, a second physical communication interface, a third physical communication interface, a fourth physical communication interface, wherein
the first physical communication interface serves to establish communications via Narrowband Asynchronous Transfer Mode (NATM) with the mobile terminal,
the second physical communication interface is a first physical remote communication interface and the third physical communication interface is a second physical remote communication interface, wherein the first physical remote communication interface and the second physical remote communication interface serve to establish remote communications via mobile networks,
the fourth physical communication interface serves to establish local communications with another box by direct communication and according to an IP protocol according to a predetermined addressing plan;
wherein the communication box uses the fourth physical communication interface when the first physical remote communication interface and the second physical remote communication interface are defective;
wherein the communication box further comprises a provisional memory in which a unique identifier of a terminal is stored, wherein only the terminal comprising the unique identifier is authorized to communicate with the communication box by a wireless local communication interface, wherein the communication box filters communications made by the wireless local communication interface, and wherein the unique identifier is a MAC address of the wireless local communication interface of the terminal.

13. The very high-availability secure communication system according to claim 12, wherein the fourth physical communication interface operates in a frequency band centered on 900 MHz.

14. The very high-availability secure communication system according to claim 12, wherein the provisional memory is written at a moment when a connection is detected on a wired physical communication interface between the mobile terminal and the communication box, the terminal serving as a peripheral device for the communication box.

* * * * *